(12) United States Patent
Graf et al.

(10) Patent No.: US 11,578,685 B2
(45) Date of Patent: Feb. 14, 2023

(54) FLUID METERING VALVE

(71) Applicant: MMT AG, Zug (CH)

(72) Inventors: Philip Graf, Sonceboz-Sombeval (CH); Marc Fuin, Trevillers (FR); Martin Lütenegger, Erlach (CH)

(73) Assignee: MMT AG, Zug (CH)

( * ) Notice: Subject to any disclaimer, the term of this patent is extended or adjusted under 35 U.S.C. 154(b) by 323 days.

(21) Appl. No.: 16/632,990

(22) PCT Filed: Jul. 12, 2018

(86) PCT No.: PCT/EP2018/068906
§ 371 (c)(1),
(2) Date: Jan. 22, 2020

(87) PCT Pub. No.: WO2019/020389
PCT Pub. Date: Jan. 31, 2019

(65) Prior Publication Data
US 2020/0208569 A1 Jul. 2, 2020

(30) Foreign Application Priority Data
Jul. 26, 2017 (FR) ..................... 1757105

(51) Int. Cl.
*F02M 26/67* (2016.01)
*F02M 26/54* (2016.01)
(Continued)

(52) U.S. Cl.
CPC ............ *F02M 26/67* (2016.02); *F02B 37/18* (2013.01); *F02B 37/183* (2013.01);
(Continued)

(58) Field of Classification Search
None
See application file for complete search history.

(56) References Cited

U.S. PATENT DOCUMENTS

| 4,463,930 A | 8/1984 | Vamvakas | |
| 6,213,106 B1 * | 4/2001 | Håkansson | F16K 31/363 251/63.4 |

(Continued)

FOREIGN PATENT DOCUMENTS

| CN | 107542603 A | * | 1/2018 | ............. F02M 26/48 |
| CN | 206845348 U | * | 1/2018 | ............. F02M 26/53 |

(Continued)

*Primary Examiner* — Kevin R Steckbauer
(74) *Attorney, Agent, or Firm* — Harness Dickey & Pierce, PLC (57) ABSTRACT

A motorised fluid metering valve includes an inlet pipe, a discharge pipe and a motor moving a piston that can move linearly between a closed position in which a distal end of the piston sealingly engages with a seat of matching shape, and an open position. The valve is configured to have a flow rate that varies continuously between the closed position and the open position depending on an axial position of the piston. The inlet pipe opens in a periphery of the discharge pipe, with a constant protuberance regardless of the position of the piston, the protuberance not extending radially beyond a barycentre of the discharge pipe. Also, the motor is a rotary electric motor moving the piston in translation.

20 Claims, 11 Drawing Sheets (51) Int. Cl.
  *F02M 26/68* (2016.01)
  *F02M 26/70* (2016.01)
  *F16K 3/24* (2006.01)
  *F02B 37/18* (2006.01)
  *F16K 31/04* (2006.01)
  *F16K 31/50* (2006.01)

(52) U.S. Cl.
  CPC ........... *F02B 37/186* (2013.01); *F02M 26/54* (2016.02); *F02M 26/68* (2016.02); *F02M 26/70* (2016.02); *F16K 3/24* (2013.01); *F16K 3/246* (2013.01); *F16K 31/04* (2013.01); *F16K 31/508* (2013.01)

(56) References Cited

U.S. PATENT DOCUMENTS

| | | | |
|---|---|---|---|
| 7,591,448 B2 | 9/2009 | Martin et al. | |
| 8,427,095 B2 | 4/2013 | Bilat et al. | |
| 8,499,557 B2 | 8/2013 | Grabowska | |
| 9,163,556 B2 * | 10/2015 | Micanek | F02B 37/183 |
| 9,638,097 B2 * | 5/2017 | Boehmer | F02B 37/16 |
| 10,336,236 B2 * | 7/2019 | Ford | B60P 3/225 |
| 10,975,760 B2 * | 4/2021 | Jin | F02B 37/183 |
| 2002/0017327 A1 | 2/2002 | Kawaai et al. | |
| 2008/0121828 A1 | 5/2008 | Martin et al. | |
| 2008/0121830 A1 | 5/2008 | Martin et al. | |
| 2008/0135026 A1 * | 6/2008 | Okada | F02M 26/55 123/568.11 |
| 2009/0229583 A1 * | 9/2009 | Kotooka | F02M 26/48 123/188.2 |
| 2011/0108013 A1 * | 5/2011 | Melhem | F02M 26/26 123/568.22 |
| 2011/0298412 A1 | 12/2011 | Bilat et al. | |
| 2014/0193240 A1 * | 7/2014 | Boehmer | F02B 37/183 415/116 |
| 2015/0121863 A1 * | 5/2015 | Micanek | F02B 37/183 60/605.1 |
| 2015/0128915 A1 * | 5/2015 | Nakamura | F16K 1/54 123/568.11 |
| 2017/0174116 A1 * | 6/2017 | Ford | B60P 3/2245 |
| 2018/0238226 A1 * | 8/2018 | Wang | F02B 37/025 |
| 2019/0170059 A1 * | 6/2019 | Jin | F16K 3/265 |
| 2019/0365993 A1 | 12/2019 | Staub et al. | |
| 2020/0208569 A1 * | 7/2020 | Graf | F16K 31/508 |
| 2021/0363915 A1 * | 11/2021 | Kitamura | F02B 37/183 |

FOREIGN PATENT DOCUMENTS

| | | | | |
|---|---|---|---|---|
| CN | 208564744 U | * | 3/2019 | ........... F01D 17/105 |
| CN | 104612818 B | * | 8/2019 | ........... F02B 37/183 |
| DE | 112009000793 T5 | * | 5/2011 | ............ F02M 26/67 |
| DE | 102013216574 A1 | * | 2/2014 | ............ F02M 26/54 |
| DE | 102018108954 A1 | * | 6/2019 | ........... F01D 17/105 |
| SE | 510777 C2 | * | 6/1999 | ........ F02M 25/0779 |
| WO | WO-2005095834 A1 | * | 10/2005 | ............... F01L 3/08 |
| WO | WO-2013/019468 A1 | | 2/2013 | |
| WO | WO-2013019468 A1 | * | 2/2013 | ............ F02B 37/16 |
| WO | WO-2015/123296 A2 | | 8/2015 | |
| WO | WO-2015123296 A2 | * | 8/2015 | ........... B60P 3/2245 |
| WO | WO-2015123296 A3 | * | 10/2015 | ........... B60P 3/2245 |
| WO | WO-2020021952 A1 | * | 1/2020 | ............. F02B 33/00 |

* cited by examiner

FLUID METERING VALVE

CROSS-REFERENCE TO RELATED APPLICATIONS

This application is a National Phase Entry of International Patent Application No. PCT/EP2018/068906, filed on Jul. 12, 2018, which claims priority to French Patent Application No. 17/57105, filed on Jul. 26, 2017, both of which are incorporated by reference herein.

TECHNICAL FIELD

The present invention relates to the field of electromechanical fluid metering valves, in particular metering valves for gases, in particular hot gases, i.e. the temperature of which can reach more than 500° C. or even 700° C., fluctuating between a low temperature such as the ambient temperature and a high temperature. Specifically, it applies to the valve sub-assembly with a poppet valve, or "piston" moved by a linear actuator, replacing the traditional flap valves typically used in hot gas metering applications. In a flap valve, the fluid is diverted at the valve inlet to the flap, which modulates the flow rate according to its distance to the valve seat or the opening thereof, relative to the valve seat. The regulation of this type of flap valve is difficult and can only be achieved through the often parabolic, profiled shape of the flap, which does not give satisfactory performance. A particular field of the invention is that of the bypass valves arranged in the supercharging circuit of an internal combustion motor, for controlling the flow of hot gas passing through a bypass or discharge channel to temporarily discharge the supercharging turbine and/or to increase the temperature in the discharge circuit.

BACKGROUND

The international patent application WO 2013019468 is known in the state of the art to describe a discharge gas turbocharger with a turbine casing having a turbine inlet and a turbine outlet and connecting a wastegate line between the turbine casing inlet and the turbine casing outlet, the wastegate being able to be opened and closed by means of a shut-off element, the shut-off element being in the form of a piston guided so as to be longitudinally moveable in the inner space of a guide, and the wastegate opening into the inner space transversely to the longitudinal centre line of the guide. This solution is not satisfactory for several reasons.
  firstly, it provides for pneumatic actuation of the piston, which requires a fluid supply and a complex installation,
  secondly, such a mode of actuation only allows an "all or nothing" control, which is incompatible with progressive metering,
  thirdly, the pneumatic actuating system must be remote from the pipe in which the hot gases flow, which implies a connection by means of a long control rod, presenting risks of deformation and malfunction.

The U.S. Pat. No. 8,499,557 describing a wastegate for a turbocharger; is also known in the state of the art. This state-of-the-art valve is equipped with a cone to provide a progressive, optimally almost linear curve of the turbocharger boost valve opening, which, according to this prior art document, is not possible with a conventional flat wastegate. The addition of a three-dimensional cone in the flow path is a much more cost-effective solution for achieving a linear flow than an approach involving finite and precise control of the valve position. One of the variants illustrated in FIG. 12 of this document proposes a linear movement of the three-dimensional cone.

The solution described in the prior art document has several drawbacks. Firstly, the proposed valve, like all poppet valves of the prior art, has a very steep "flow/piston position" curve in the opening sequence. The valve proposed in the prior art claims to allow a more progressive curve, close to a straight line, but does not allow to define a very progressive curve, allowing a fine metering at the opening. This is a real disadvantage for some applications requiring a very progressive opening, with an "S-shaped" curve for example (on an imaginary pressure versus opening diagram), such as gas bypass applications for a turbocharger.

Another disadvantage of prior art solutions is that the valve forms a protuberance that disturbs the fluid flow and, in some applications such as turbocharger discharge applications, disturbs the mixing of the fluid controlled by the valve with a fluid flowing in a main line. Other secondary disadvantages include the difficulty of achieving a good sealing around the actuator shaft. In this sense, the solutions of the prior art allow to provide one or the other function (fine adjustment of the opening and good sealing) but do not allow to achieve both functions with a reliable, simple and industrializable architecture. In particular, in the prior art documents, it is difficult to guarantee a fine adjustment while maintaining a so-called "internal" sealing, corresponding to the absence of fluid leakage from the inlet to the discharge when the valve is closed, and a so-called "external" sealing, corresponding to the absence of fluid leakage from the inlet/discharge channels to the outside of the valve.

SUMMARY

The purpose of the invention is to remedy the above-mentioned drawbacks by making it possible in particular to propose a metering valve ensuring precise metering while guaranteeing good sealing in the closed position. It is also one of the objects of the invention to provide a metering valve that does not interfere with the gas flow at the outlet by minimizing the intrusion of the valve into the discharge pipe into which it opens. It is another object of the invention to provide a compact motorized metering valve cooled by a heat transfer fluid, which allows to manage the metering of hot fluid while ensuring a free positioning of the actuator in the application. Finally, it is one of the objects of the invention to provide a simple metering valve, with a reduced number of parts and an easily industrializable design.

More particularly the invention concerns a motorized fluid metering valve comprising an inlet pipe, a discharge pipe and a motor moving a piston that can move linearly between a closed position in which the distal end of said piston sealingly engages with a seat of matching shape, and an open position, said valve being configured to have a flow rate that varies continuously between said closed position and said open position depending on the axial position of said piston, said inlet pipe opening in the periphery of the discharge pipe, with a constant protuberance regardless of the position of said piston, said protuberance not radially extending beyond the barycentre of said discharge pipe, characterised in that said motor is a rotary electric motor moving said piston in translation. This configuration ensures that the fluid flow is not disturbed, regardless of the setting position of the valve. Advantageously, said motor is a rotary electric motor driving said piston by means of a shaft the end of which, opposite said piston is threaded and cooperates with a fixed nut in translation which is driven directly by the rotor of said electric motor. Advantageously, said inlet pipe opens in the periphery of the discharge pipe, with a constant protuberance regardless of the position of said piston, said protuberance not radially extending beyond the barycentre of said discharge pipe.

According to alternative solutions:
said shaft has an anti-rotation element which cooperates with a fixed element of the motor,
said inlet pipe radially opens in said discharge pipe,
said inlet pipe tangentially opens in said discharge pipe,
—said piston is actuated integrally with a drive shaft of a motor,
according to a so-called "pulled closure" mode, said distal end of said piston sealingly engages with a seat of matching shape when said piston is in a position close to said motor,
according to a so-called "push closure" mode, said distal end of said piston sealingly engages with a seat of matching shape when said piston is in a position away from said motor,
said piston has at least one sealing ring,
said piston is hollow and opens in the direction of a sealing flap forming the distal end coming into contact with said seat in the closed position,
said piston is movable in a liner embedded in said inlet pipe, said piston having at its distal part means for sealing with respect to said liner,
in order to cool the motor for actuating the valve, the valve comprises a flange on which the motor is fixed and which comprises channels for the circulation of a heat-transfer fluid,
the flange is hollow, said inlet pipe has a hollow receiving structure for receiving said hollow flange and in that a seal is positioned at the interface of said flange and said receiving structure,
the flange has a multi-periodic geometry, for example a 90° periodicity, without this being restrictive, in order to allow the motor to be positioned in several possible orientations, depending on the size of the application.

The invention also relates to a wastegate for a turbocharger comprising a fluid metering valve as described above. Alternatively, the axis of said inlet pipe is positioned in a transverse plane of said discharge pipe, said inlet pipe having an orifice opening tangentially to the periphery of the discharge pipe. According to another variant, the axis of said inlet pipe is positioned radially, in a transverse plane of said discharge pipe, said inlet pipe having an orifice opening in a peripheral zone of said discharge pipe without forming a protuberance at the level of the axis of said discharge pipe. The invention further relates to an exhaust gas recirculation valve using a fluid metering valve as described above.

BRIEF DESCRIPTION OF THE FIGURES

Other characteristics and advantages of the invention will appear in the description that follows relative to detailed embodiments, and referring to the attached figures that represent respectively.

DETAILED DESCRIPTION

Figure 1A:
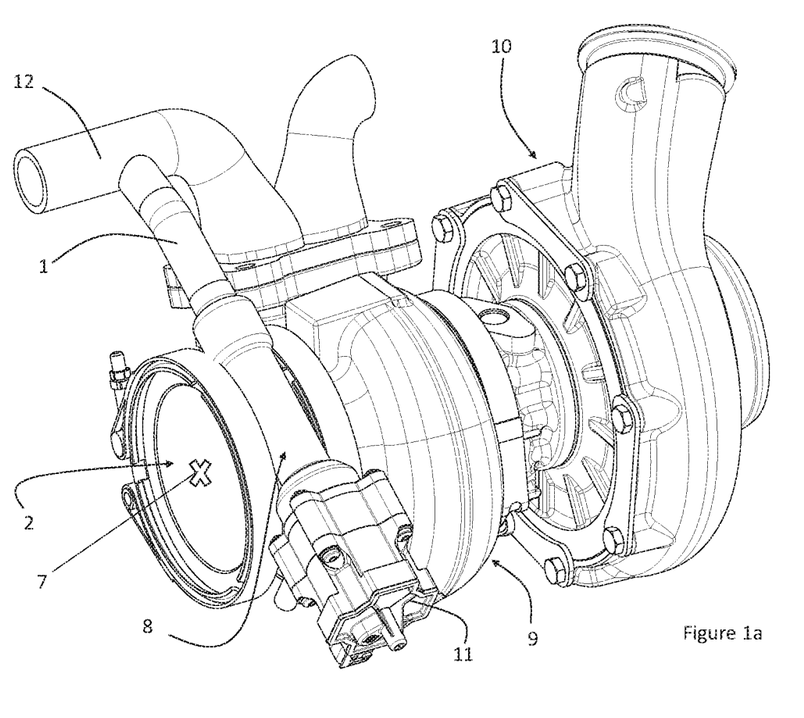
FIGS. 1a and 1b, views from two different perspectives of a valve in an application and according to a first so-called tangent mode, of implementing the invention.
Figure 1B:
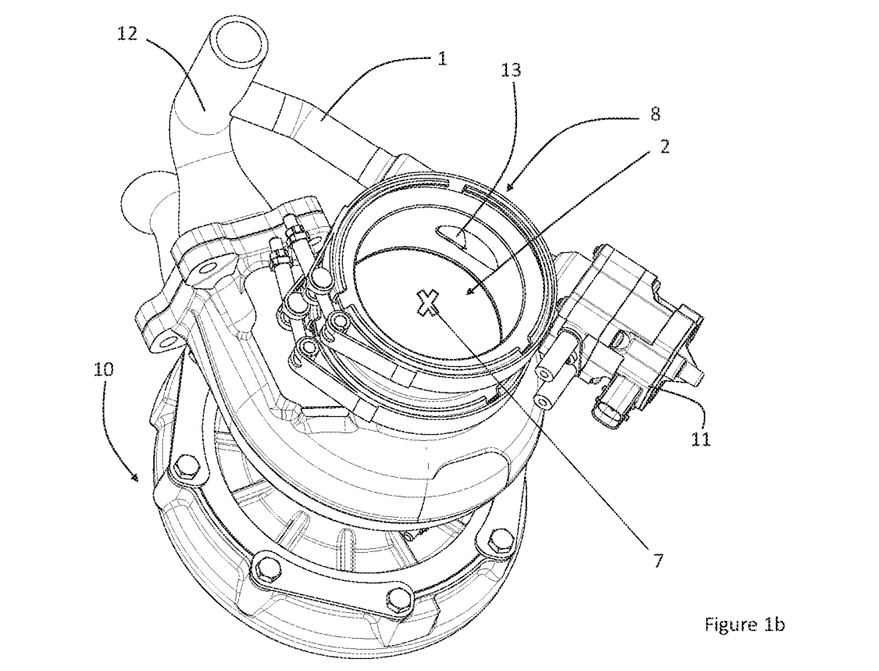

In FIGS. 1a and 1b, a metering valve 8 according to the invention is positioned in a turbocharger discharge application, in a so-called "tangent" embodiment, referring to the position of the actuating axis relative to the exhaust pipe 2. The turbocharger comprises a turbine 9, which the metering valve 8 is connected to, and a compressor 10, the operating details of which are not included here because they correspond to a classical architecture in a modern automobile (a car or a truck).

The metering valve 8 acts at the periphery of a discharge pipe 2 of the turbine and discharges a more or less significant and adjustable amount of a gas from an inlet pipe 1. In this turbocharger discharge application, the inlet pipe 1 is charged with hot gas from the exhaust 12 of the internal combustion motor. It joins the turbine 9 in order to drive the fresh air compressor 10 to reach the intake of the internal combustion motor.

In order to unload the turbine, i.e. to avoid too high turbine rotation speed which could damage the system, or simply to reduce the air compression, it is necessary to unload part of the hot gas supplied by the motor discharge pipe 12 to the discharge pipe 2 through the inlet pipe 1. It may also be necessary to send part of the hot gases to the motor cylinders to help clean the exhaust gas or these exhaust gases may be sent to the after-treatment of the exhaust gas to increase the treatment temperature (thermal management). This is achieved by short-circuiting the hot drive gas so that it cannot reach the turbine blade (not visible) of the turbine 9. The metering valve 8 allows this function advantageously thanks to the concept provided by the present invention, by minimizing the intrusion into the discharge pipe 2, far from the barycentre of the latter, and by allowing fine adjustment and ensuring a good sealing of the valve.

Figure 2:
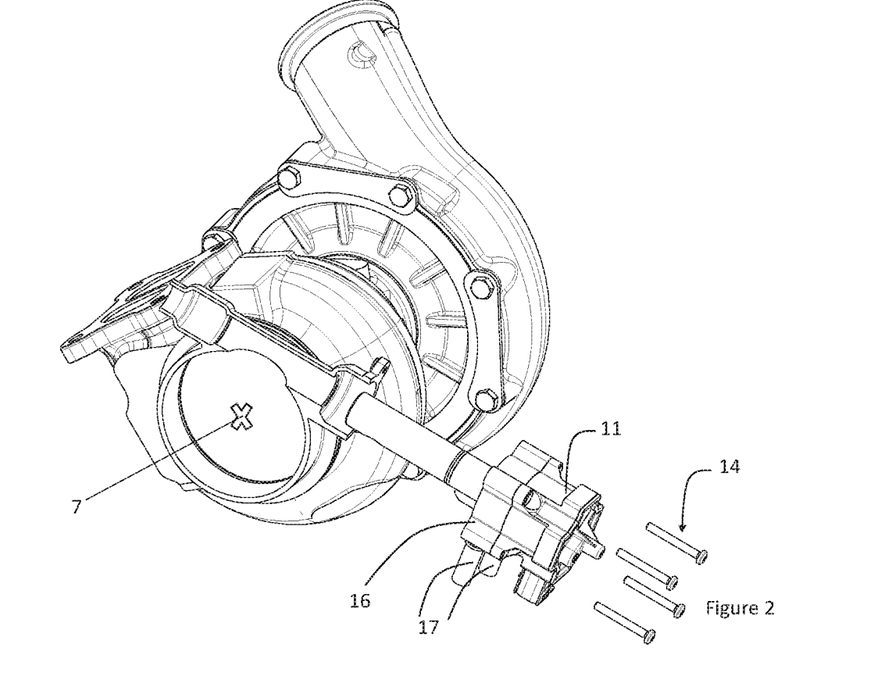
FIG. 2, a perspective view of a valve in an application according to a first embodiment of the invention.

This metering valve 8 comprises a motor 11 moving a piston 3 which shuts off an orifice 13 located on the periphery of the discharge pipe 2. The motor is positioned along its actuating axis, which is oriented perpendicular to the discharge pipe. This peripheral position, remote from the barycentre 7 of the discharge pipe 2, i.e. remote from the centre of said pipe 2, makes it possible to minimise the intrusion of the metering valve 8 into the mechanical flow of the gases expelled by said discharge pipe 2, regardless of the actual metering position, as shown through various positions of the piston 3 more or less shutting off the orifice 13 in FIGS. 6a to 6f. In this "tangential" embodiment, the metering valve 8 is easily attached to the inlet line 1, e.g. by means of several screws 14, as shown in an exploded view in FIG. 2.

Figure 3A:
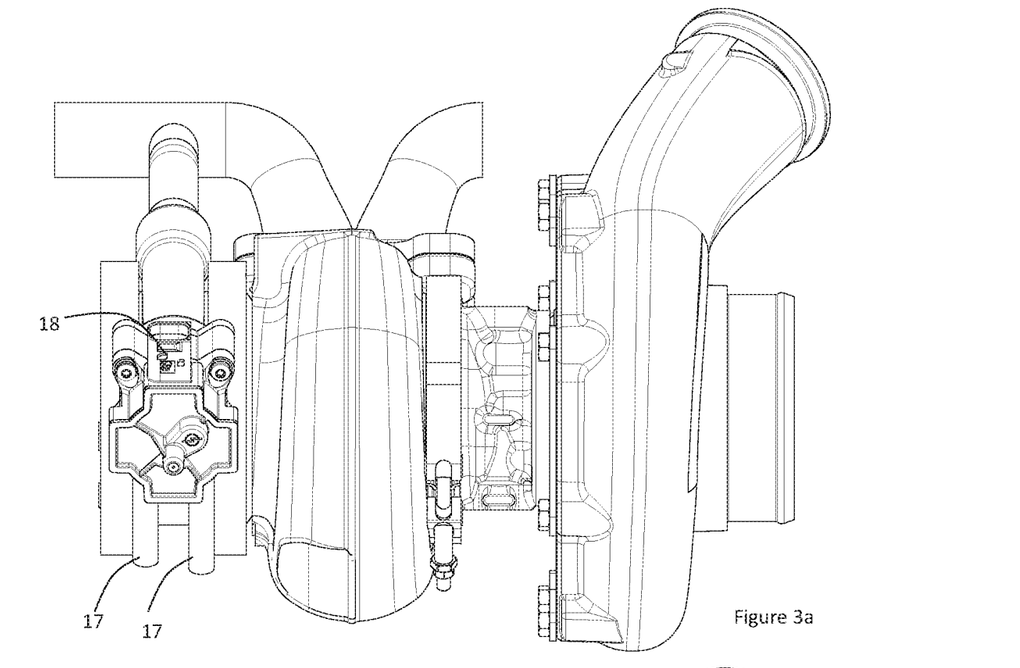
FIGS. 3a, 3b and 3c, side views of a valve in an application with several embodiments of the invention with different orientations of the electrical connector and the cooling channel.
Figure 3B:
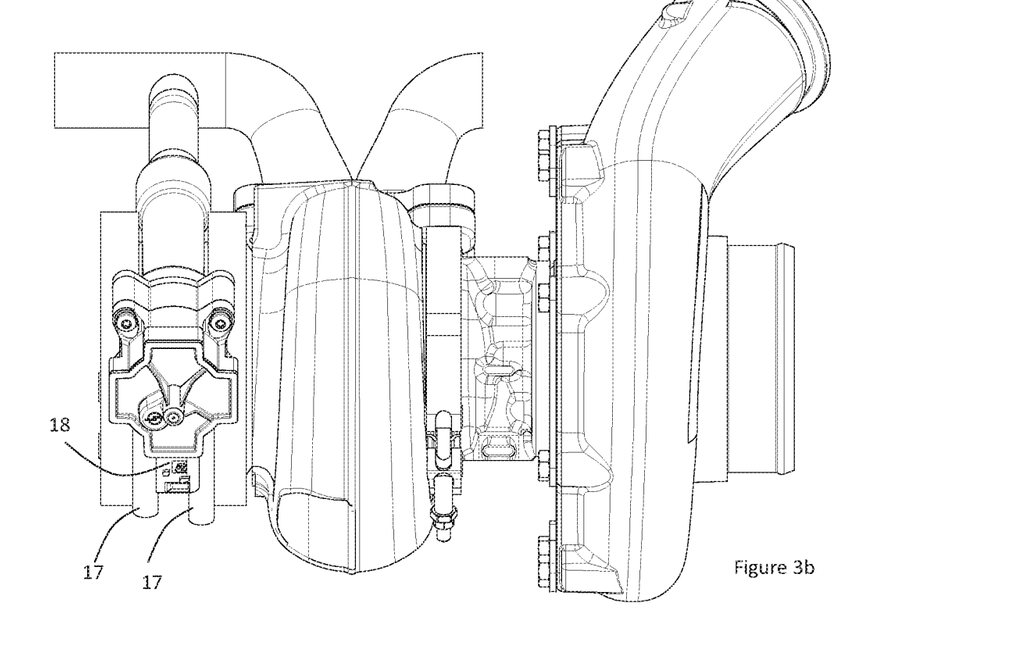
Figure 3C:
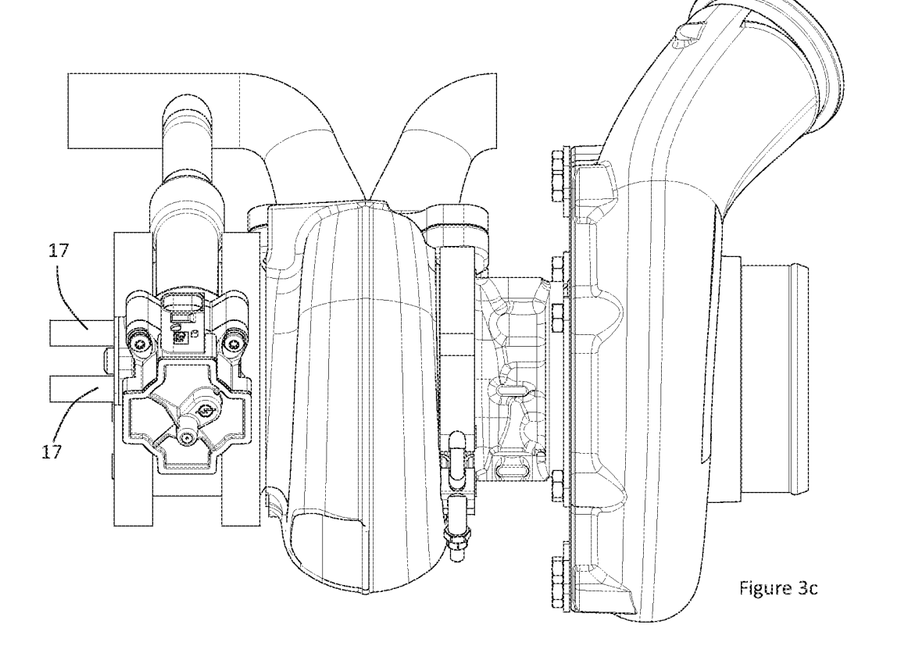

Due to the high temperature of the hot gases being directed—in the order of several hundred degrees, typically 700° C.—it is possible to achieve cooling by circulating a heat-transfer fluid, typically water, between the motor 11 and the inlet pipe 1 in the flange 16 via circulation channels 17. The valve design also allows these channels 17 to be positioned in different orientations relative to the inlet pipe 1, as shown in FIGS. 3b and 3c. The flange 16 has a periodicity (e.g. 90°, without this value being restrictive) which allows it to be oriented, with the motor 11, in several possible directions depending on the available space. The cooling principle is explained further in FIG. 8a. Also, the valve concept is flexible and allows the electrical connector 18 to be positioned on several sides, as shown in FIGS. 3a and 3b.

Figure 4:
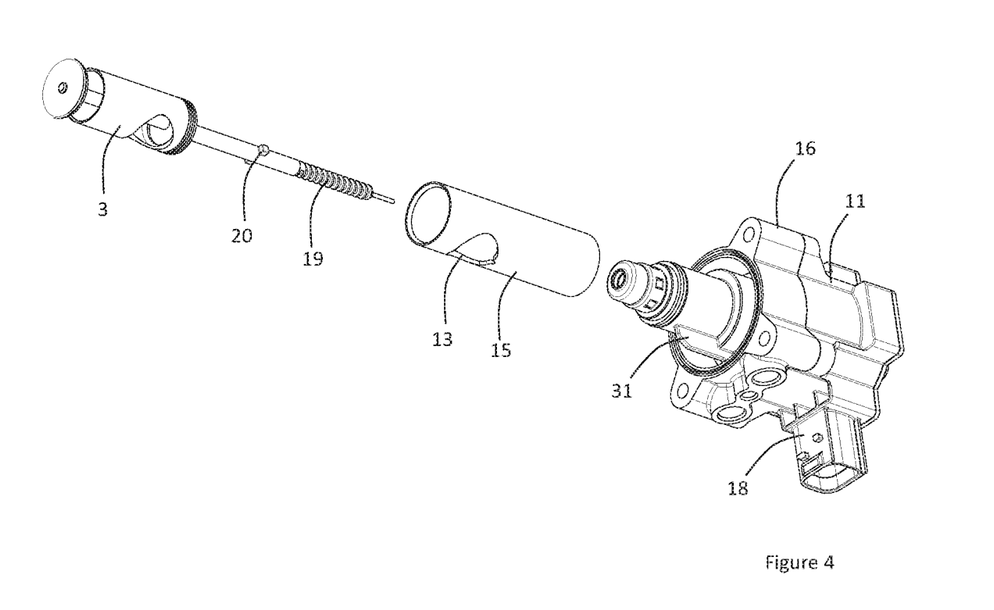
FIG. 4 shows a cross-sectional view of a valve according to the invention.

In a preferred embodiment, the metering valve 8 has, as can be seen in FIG. 4 in an exploded view, a motor 11 acting on a piston 3 via a screw 19 integral with a shaft 28, said piston 3 being moved inside a liner 15 which forms the interface between the inlet pipe 1 and the piston 3. For all embodiments, in the case where the screw 19 must be moved with no rotation of the piston 3, which is not obligatory, the screw has an anti-rotation element 20 which cooperates with a fixed motor element 11. The movement of the piston can also be helical, depending on the type of motion transformation used.

Figure 5A:
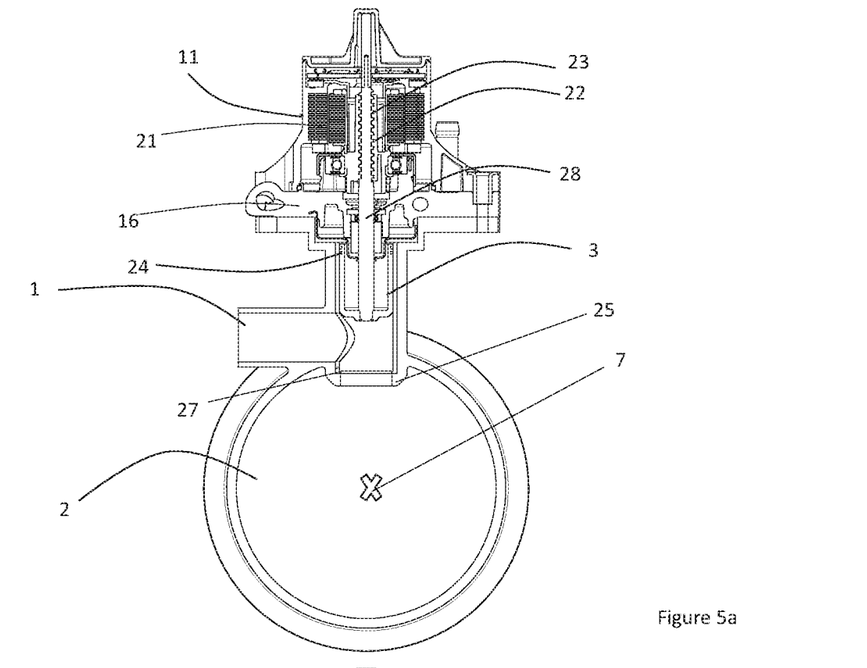
FIGS. 5a and 5b, sectional views of a valve according to a second so-called radial, embodiment.
Figure 5B:
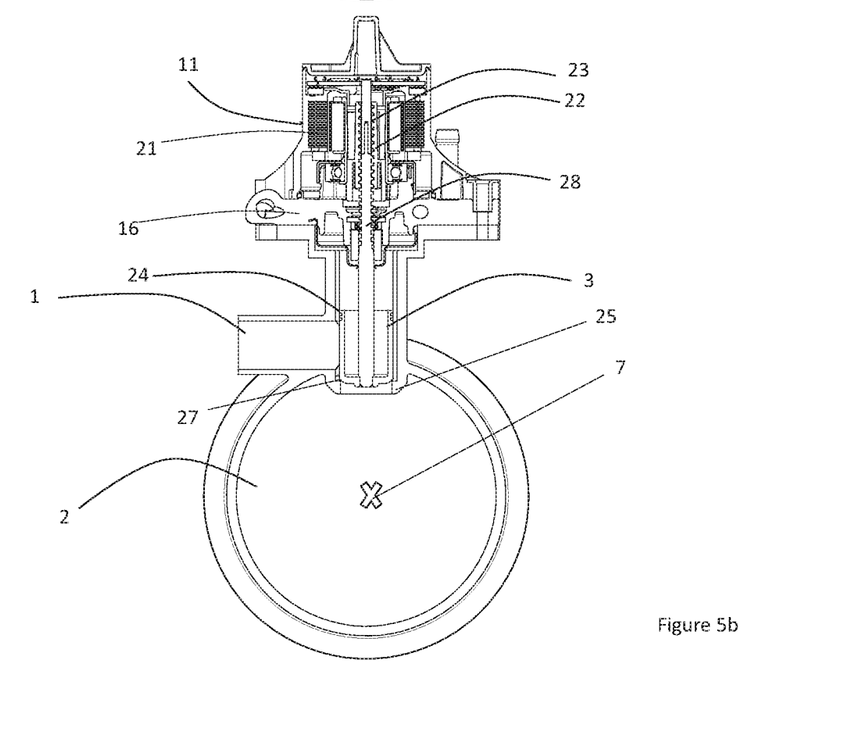
Figure 6A:
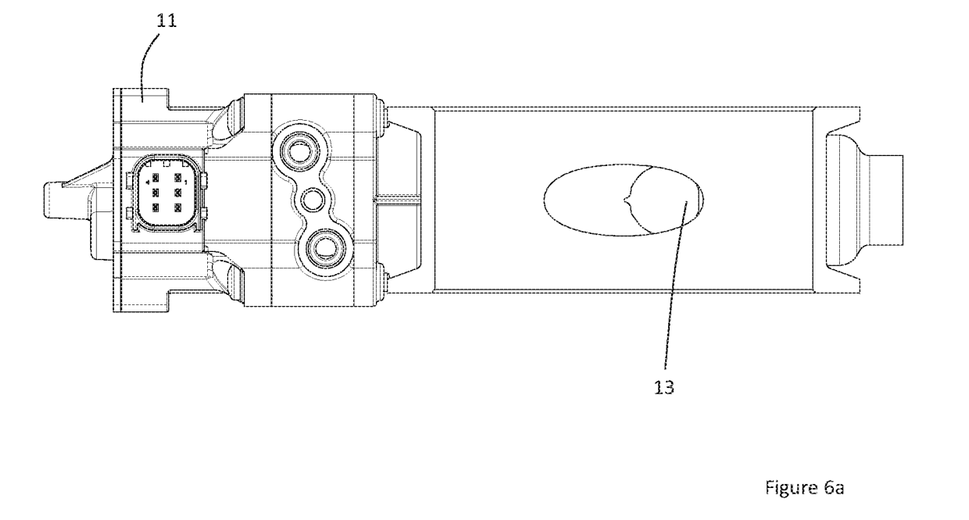
FIGS. 6a to 6f, views of the underside of a valve according to the first embodiment, allowing to appreciate the progressive opening of the shut-off orifice.
Figure 6B:
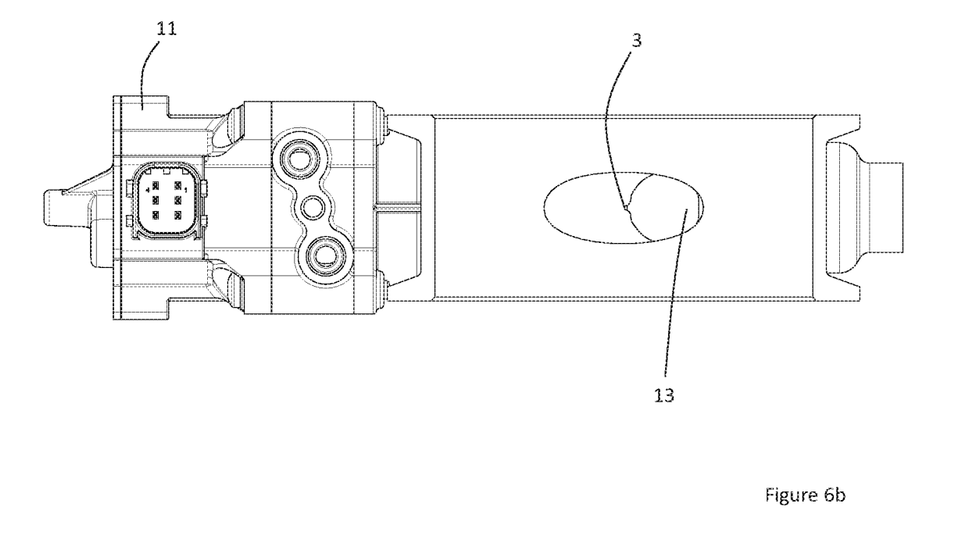
Figure 6C:
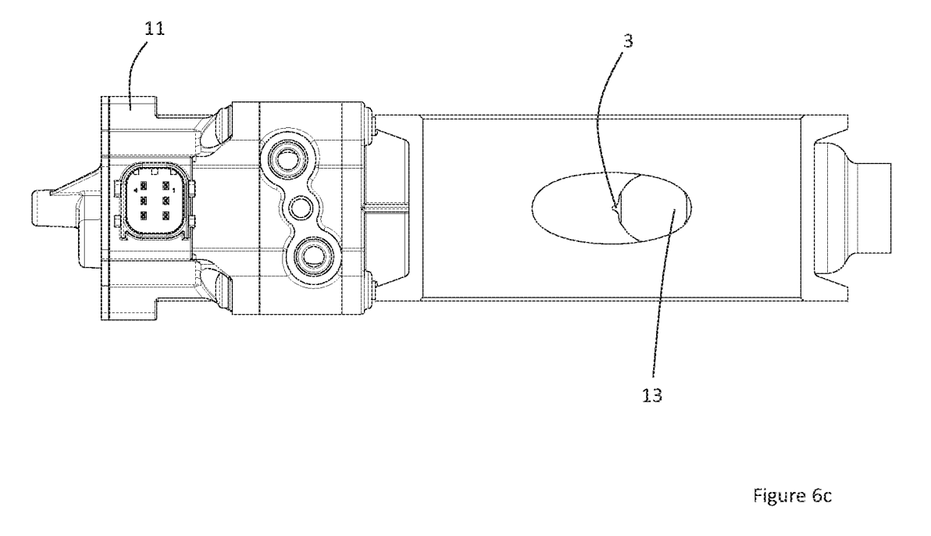
Figure 6D:
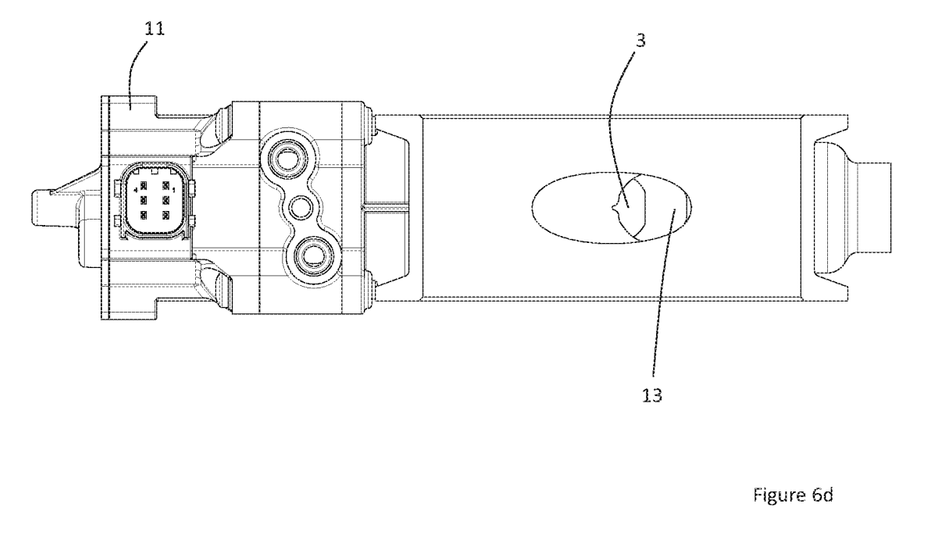
Figure 6E:
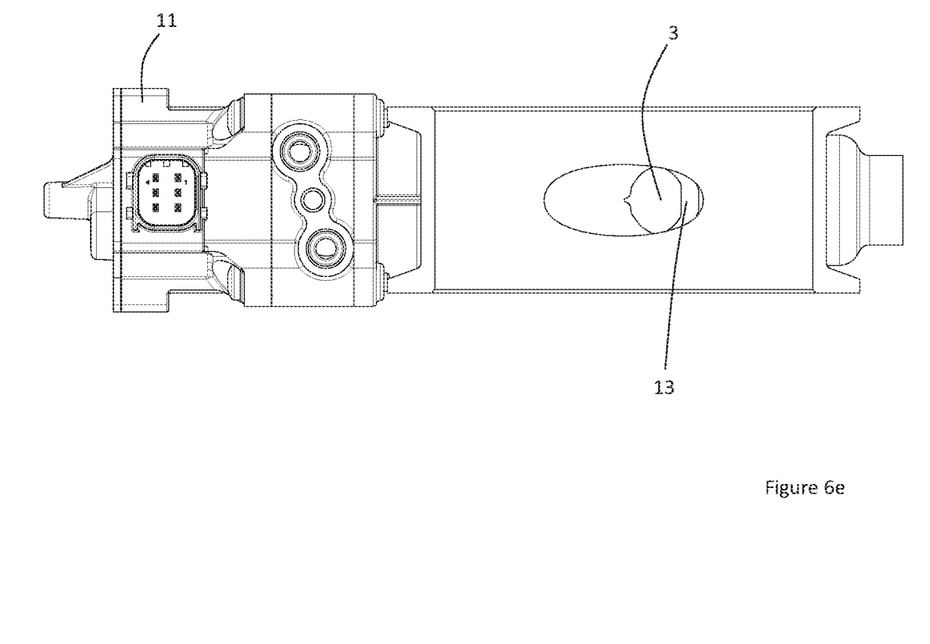
Figure 6F:
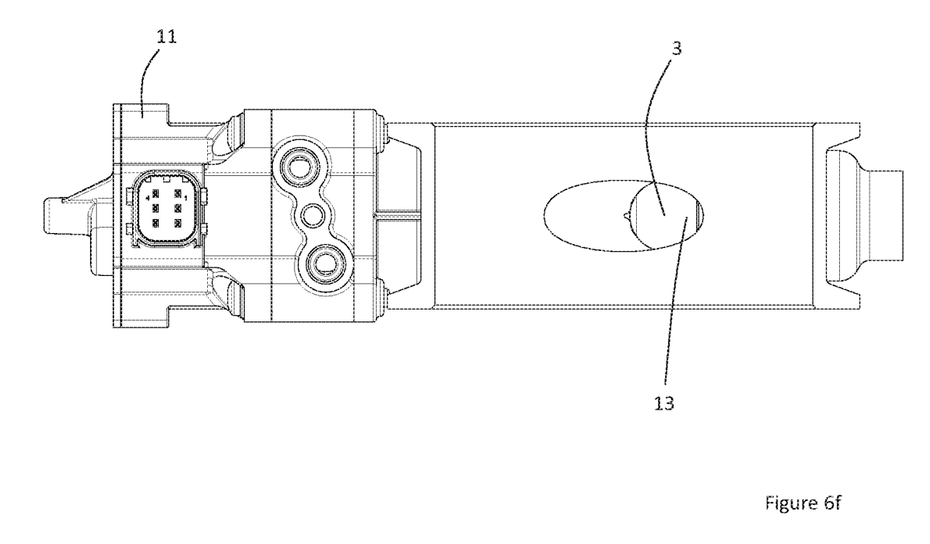

A second so-called "radial" embodiment is shown in FIGS. 5a and 5b, referring to the direction of actuation relative to the discharge pipe 2. The motor is positioned along its actuating axis, which is oriented perpendicularly to the discharge pipe. These sectional views, which show the discharge pipe 2, the inlet pipe 1—in part—and the motor 11, also make it possible to appreciate the interior of said motor 11 which comprises a wound stator part 21 and a rotor 22 connected to a nut 23, fixed in translation. When the motor 11 is controlled by reaction, the rotor 22 causes the screw 19 and thus the piston 3 to move linearly via the nut 23. The piston can therefore be moved from an open position, as in FIG. 5a, where the turbocharger discharge is maximum, to a closed position, as in FIG. 5b, where discharge is not permitted by the total obstruction of the inlet pipe 2 by the piston 3 resting on the seat 27.

In order to ensure the immunity of the motor 11 to the hot circulating gas, O-ring type seals 24 or more generally piston ring type seals are placed on the piston 3. The number of these rings is not restrictive and may vary. Advantageously, and as shown in FIGS. 5a and 5b, two rings can be used.

Figure 7A:
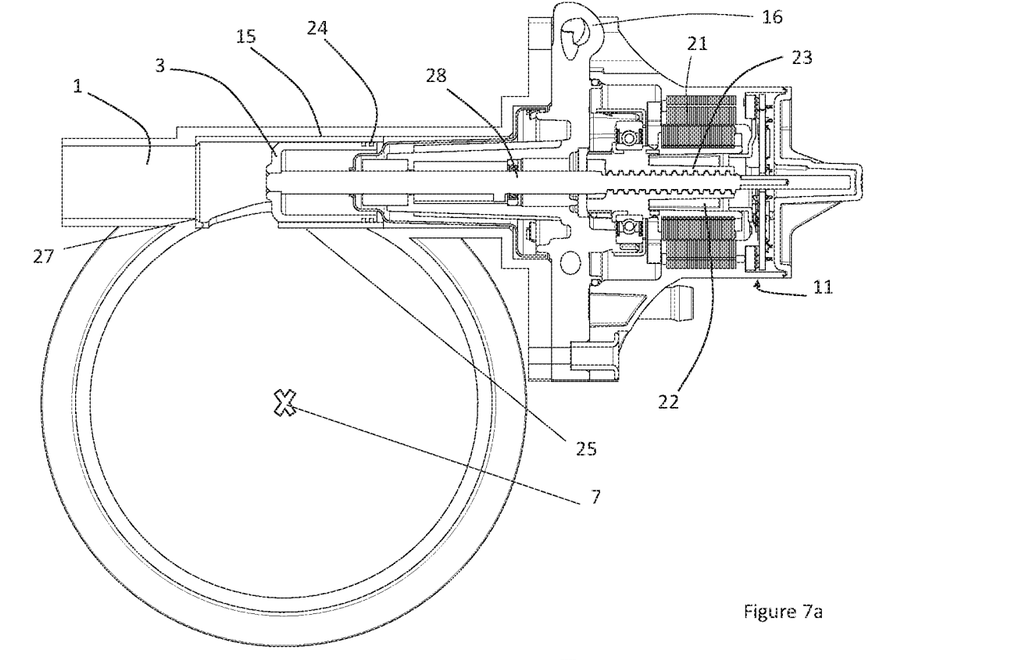
FIGS. 7a and 7b, sectional views of a valve in a "push closure" embodiment, showing different openings of the shut-off orifice.
Figure 7B:
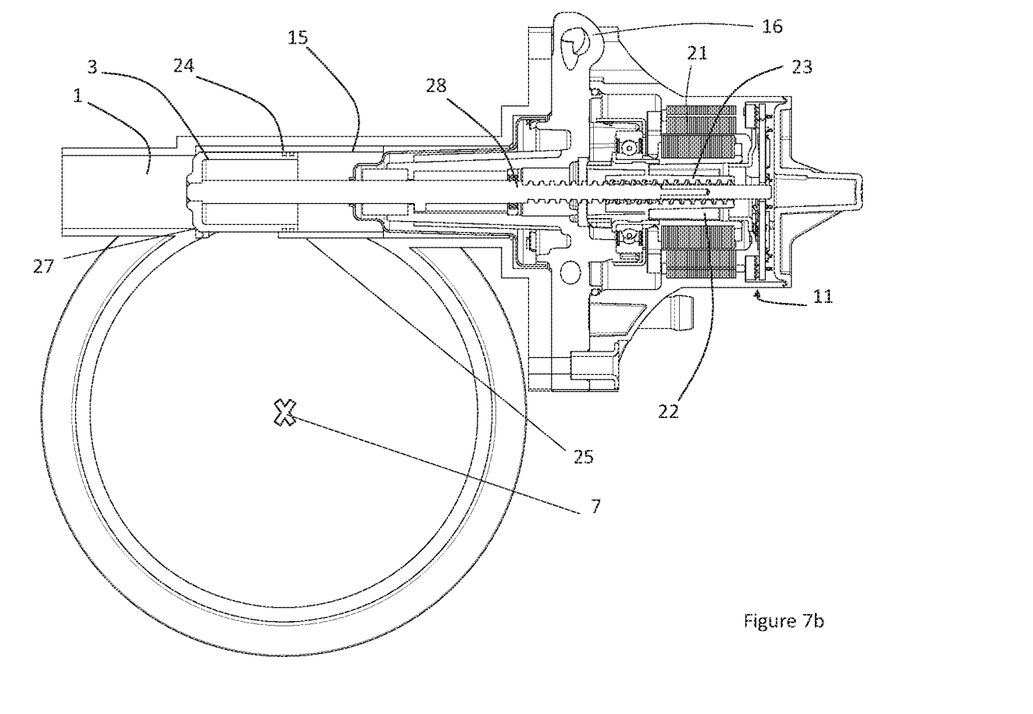
Figure 8A:
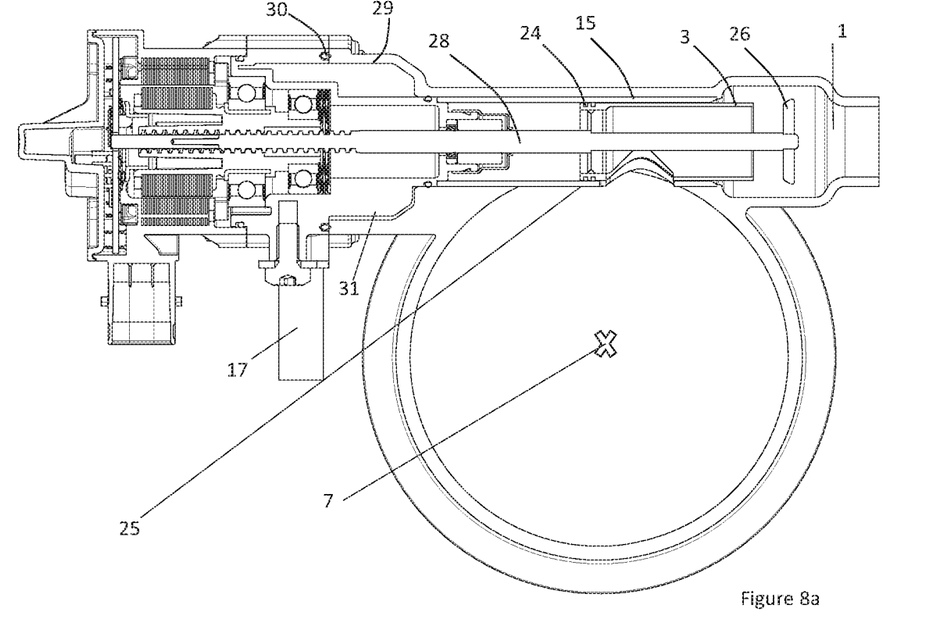
FIGS. 8a and 8b, sectional views of a valve in a "pulled closure" embodiment, showing different openings of the shut-off orifice.
Figure 8B:
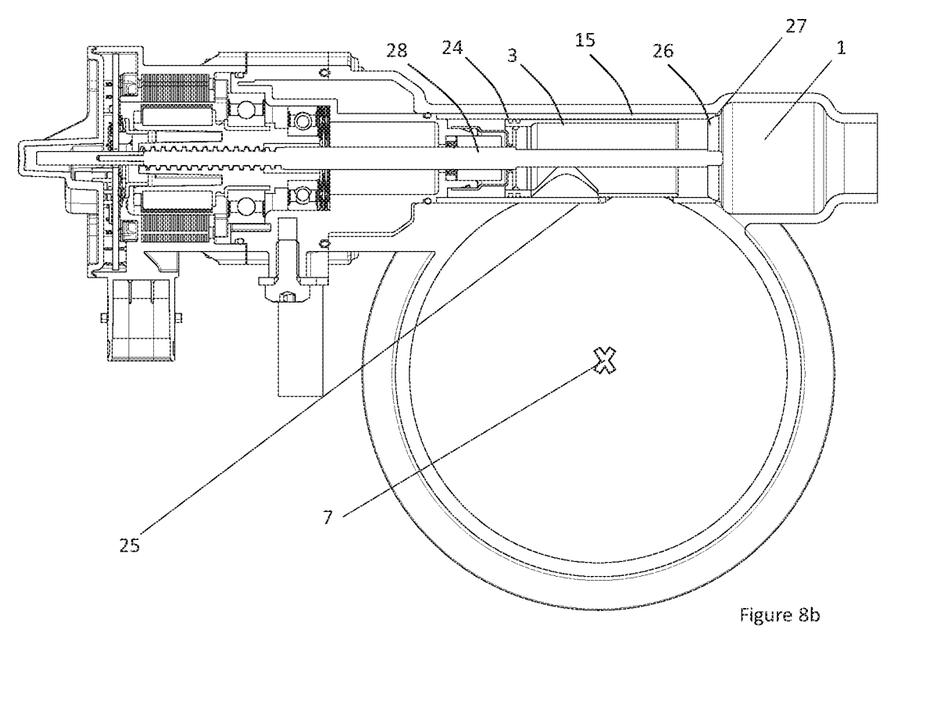
Figure 9:
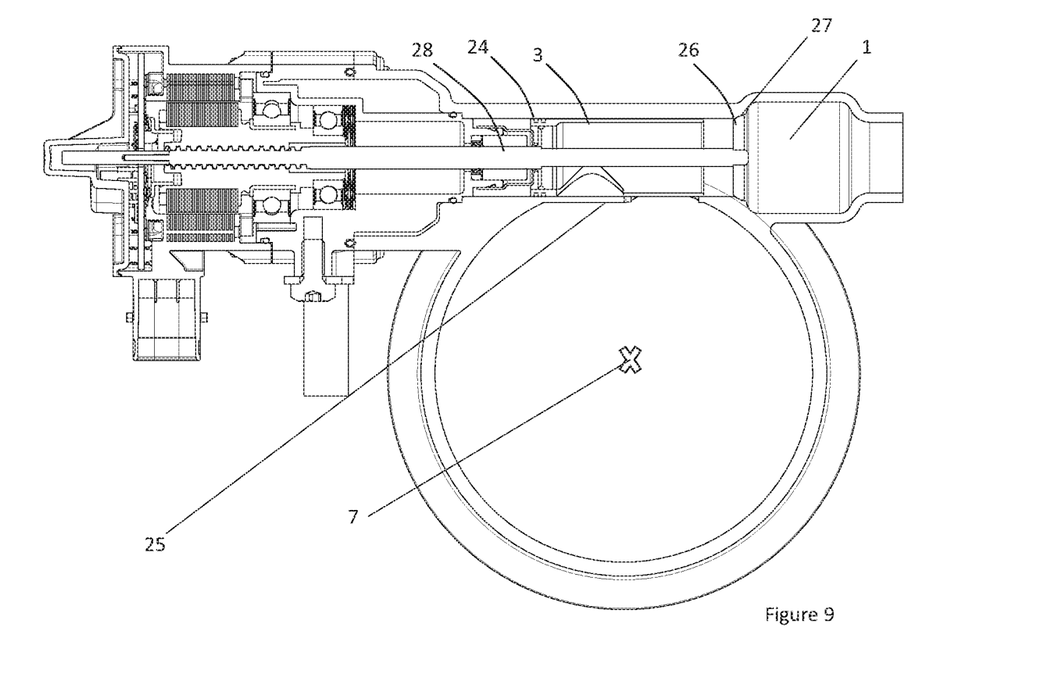
FIG. 9 shows a sectional view of a valve in a so-called "pulled closure" embodiment, in an alternative linerless embodiment.

The configuration in FIGS. 5a and 5b corresponds to a so-called "push close" mode, in which the motor 11 pushes the piston 3 to shut-off the orifice 13. This is also the case for the embodiments in FIGS. 7a and 7b, while FIGS. 8a, 8b and 9 represent a so-called "pulled closure" mode, in which the motor 11 pulls the piston 3 to shut-off the orifice 13. The choice of either closing mode, as well as the choice of tangential or radial orientation of the metering valve 8 may be imposed by space requirements or embodiments which are not described here. These different embodiments are possible alternatives which are all protected by the present invention, without limitation. Indeed, each of them makes it possible to act on the periphery of the discharge pipe 2 without hindering the dynamics of the fluid flowing in said pipe 2, whatever the shut-off position of said inlet pipe 1. In this respect, the embodiments of FIGS. 1a, 1b and 2 form a minimum protuberance 25 in the discharge pipe 2, whereas the embodiments of FIGS. 5a and 5b, for example, have a slightly larger protuberance 25, without however hindering the main volume of the discharge pipe 2, far from the barycentre 7 of said pipe 2.

The configuration shown in FIGS. 8a and 8b, known as "pulled closure", has a hollow piston 3 extended by a flap 26 which, in the closed position (FIG. 8b), comes to sit against a seat 27, integral with the liner 15. This liner 15 therefore has several advantages: absorbing positioning tolerances between the inlet pipe 1 and the metering valve 8, providing the sealing of the motor 11 by means of gaskets 24, providing the seat 27 of the flap 26, providing an adjustment of the window geometry independently of the surface resulting from the intersection of the two inlet 1 and discharge pipes 2.

FIG. 8a shows the principle of heat transfer fluid cooling. It should be noted that the description given for this figure is not exclusive to the embodiment presented and may apply indifferently to all other embodiments provided in this document or resulting, more generally, from the invention.

This cooling principle is therefore implemented with the flange 16 on the one hand, which corresponds to a first hollow part, which is housed on the receiving structure 29 of the inlet pipe 1. This support structure 29 is also hollow and a gasket 30 is at the interface between this support structure 29 and the flange 16. The heat transfer fluid, coming and going out through the channels 17, therefore flows through the hollow flange 16 and the receiving structure 29 is hollow as well. In the case where the channels 17 are relatively close to each other, it is proposed to position, between said channels 17, a separating wall 31 which will force the flow of the heat-transfer fluid to circulate in the entire space generated by the hollow flange 16 and the receiving structure 29 by limiting the short-circuit.

FIG. 9 shows an alternative "tangent pull closure" embodiment in which the liner 15 is removed to minimize the number of pieces. Sealing is provided directly between the inlet pipe 1 and the piston 3. The main advantages provided by a metering valve 8 according to the invention are to achieve continuous accurate metering, i.e. a partial obstruction finely controlled by the motor 11 via the piston 3, while at the same time ensuring a very good sealing since the piston 3 comes to completely and hermetically close the orifice 13. It is specified that the technical characteristics described in detail with reference to one embodiment are not limited to such embodiment exclusively, but may also be applied to another embodiment where they are not described in such detail to avoid redundancy.

The invention claimed is:

1. A motorised fluid metering valve comprising:
   an inlet pipe;
   a discharge pipe;
   a motor moving a piston that can move linearly along an actuating axis between a closed position in which a distal end of said piston sealingly engages with a seat of matching shape, and an open position;
   said valve being configured to have a flow rate that varies continuously between said closed position and said open position depending on an axial position of said piston;
   said inlet pipe opening into a periphery of said discharge pipe with a constant protuberance regardless of said position of said piston, said protuberance not radially exceeding a barycentre of said discharge pipe;
   said motor being a rotary electric motor driving said piston in translation, and said motor being positioned along its operating axis, which is oriented perpendicular to said discharge pipe; and said piston being configured to move inside said protuberance.

2. A fluid metering valve according to claim 1, wherein said piston is driven by a shaft, the end of which, opposite said piston, is threaded and cooperates with a fixed nut in translation which is driven directly by a rotor of said electric motor.

3. A fluid metering valve according to claim 2, wherein said shaft has an anti-rotation projection laterally extending from a side of said shaft which cooperates with a stationary motor part.

4. A fluid metering valve according to claim 1, wherein said inlet pipe radially opens in said discharge pipe.

5. A fluid metering valve according to claim 1, wherein said inlet pipe tangentially opens in said discharge pipe.

6. A fluid metering valve according to claim 1, wherein said piston is actuated by an elongated drive shaft of said motor, in a linear direction within said intake pipe substantially perpendicular and tangential to a flow direction of said discharge pipe, and said piston is elongated in said linear direction which is coaxial with a rotational centerline of a rotor of said motor.

7. A fluid metering valve according to claim 1, wherein in a "pulled closure" mode, said distal end of said piston sealingly engages with said seat of matching shape when said piston is in a position close to said motor, and a shaft coupling said piston to said motor is external to said discharge pipe.

8. A fluid metering valve according to claim 1, wherein in a so-called "push closure" mode, said distal end of said piston sealingly engages with said seat of matching shape when said piston is in a position away from said motor, and a shaft coupling said piston to said motor is external to said discharge pipe.

9. A fluid metering valve according to claim 1, wherein said piston has at least one sealing ring, and an elongated and cylindrical liner is located between said intake pipe and said piston, said liner includes a hot air orifice where said intake pipe is open to said discharge pipe when said piston is in said open position.

10. A fluid metering valve according to claim 1, wherein said piston is hollow and opens in a direction of a sealing flap forming said distal end coming into contact with said seat in said closed position, a distal end of said piston is enclosed and an opposite proximal end of said piston closest to said motor is open, and an elongated shaft coupling said piston to said motor linearly moves with said piston within said intake pipe.

11. A metering valve according to claim 1, wherein said piston is configured to move in a sleeve embedded in said inlet pipe, said piston includes at its distal part a seal with respect to said sleeve, and said sleeve has a hot air orifice in a side thereof between open ends thereof.

12. A metering valve according to claim 1, further comprising a flange on which said motor is fixed and which comprises channels operably circulating a heat-transfer fluid, and a channel circulating said heat-transfer fluid to said flange.

13. A metering valve according to claim 12, wherein said flange is hollow, said inlet pipe has a hollow receiving structure for receiving said hollow flange and a seal is positioned at an interface of said flange and said receiving structure.

14. A metering valve according to claim 12, wherein said flange has a multi-periodic geometry.

15. A wastegate for a turbocharger comprising a metering valve comprising:

a gas inlet pipe;

a turbocharger discharge pipe;

a piston coupled to a shaft elongated along a piston actuating axis;

an electric motor configured to move said piston linearly along said piston actuating axis between a closed position in which a distal end of said piston sealingly engages with a seat, and an open position;

said valve being configured to have a flow rate that varies continuously between said closed position and said open position depending on an axial position of said piston;

said inlet pipe including an orifice opening in a periphery side wall of said discharge pipe;

said piston being offset from and not being located at a central axis of said discharge pipe;

said piston having a constant radially cross-sectional protuberance inside both said inlet pipe and said discharge pipe regardless of said position of said piston; and said electric motor driving said piston in translation, and said electric motor being positioned along said piston actuating axis, which is oriented perpendicular to said central axis of said discharge pipe.

16. A wastegate for a turbocharger according to claim 15, wherein an axis of said inlet pipe is positioned in a transverse plane of said discharge pipe, said inlet pipe having said orifice opening tangentially to said periphery of said discharge pipe, and said electric motor is a rotary electric motor comprising a stator and a rotor, and said rotor is coupled to said shaft.

17. A wastegate for a turbocharger according to claim 16, wherein a cooling fluid channel located laterally between an external structure and the shaft, and longitudinally between said piston and said electric motor.

18. An exhaust gas recirculation valve assembly comprising:

a gas inlet passageway;

an exhaust gas recirculation discharge passageway having a central flow axis offset angled from a central flow axis of said inlet passageway which is coupled thereto at an orifice;

a valve surface connected to an axially elongated stem;

an electric actuator being configured to move said stem which linearly moves said valve surface within said inlet passageway between a closed position, blocking said orifice, and an open position; and said valve surface having a constant protuberance within said discharge passageway regardless of said position of said valve surface, said protuberance being offset from a center of said discharge passageway and said stem being entirely external to said discharge passageway.

19. An exhaust gas recirculation valve assembly of claim 18, further comprising:

said valve surface being part of a piston which is longitudinally elongated along said central axis of said intake passageway;

said electric actuator comprising a rotor within a stator, said rotor being coupled to and operably moving said stem; and a turbocharger turbine, said inlet passageway operably carrying hot exhaust gas to the turbocharger turbine and being configured to unload the turbocharger turbine by discharging part of said hot gas to said discharge passageway when the valve surface opens said orifice.

20. An exhaust gas recirculation valve assembly of claim 18, further comprising:
   said valve surface operably linearly moving within said intake passageway along said central flow axis of said intake passageway, which is tangential to said central flow axis of said discharge passageway;
   a liner located within said intake passageway, said liner providing a seat against which said valve surface completely and hermetically seals; and
   a flow rate varying between said closed position and said open position of said valve surface depending on an axial position of said valve surface relative to said orifice.

* * * * *